March 19, 1940.  J. B. FRANKS, JR., ET AL  2,193,865
MOTOR VEHICLE CONTROL MECHANISM
Filed April 6, 1938  2 Sheets-Sheet 2
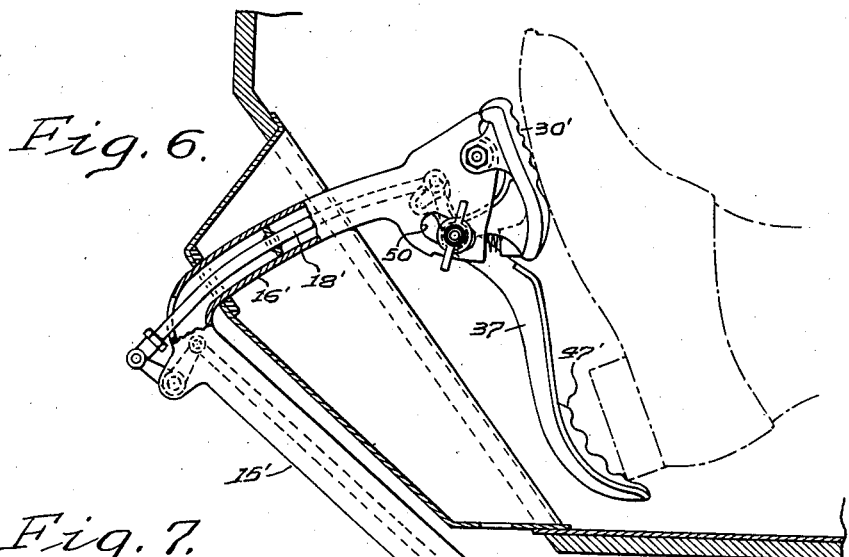
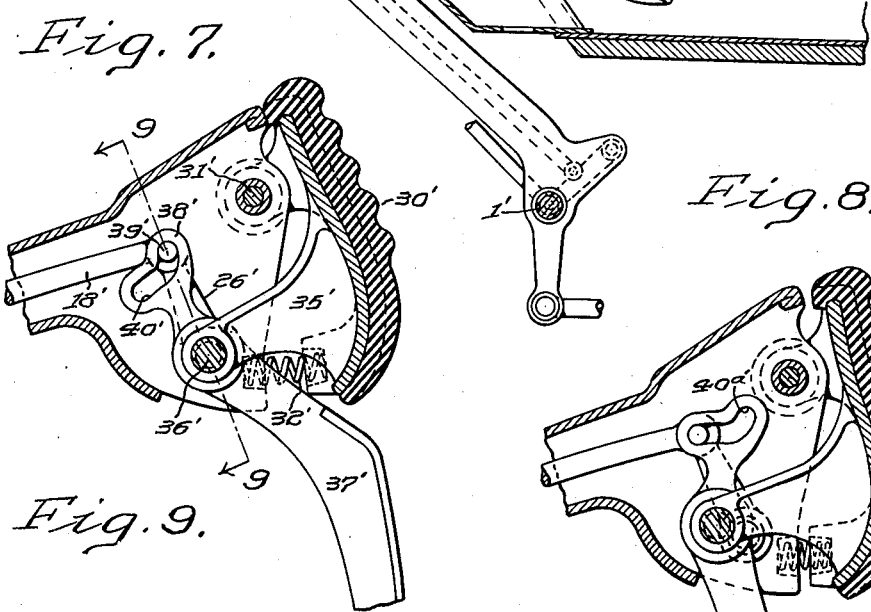
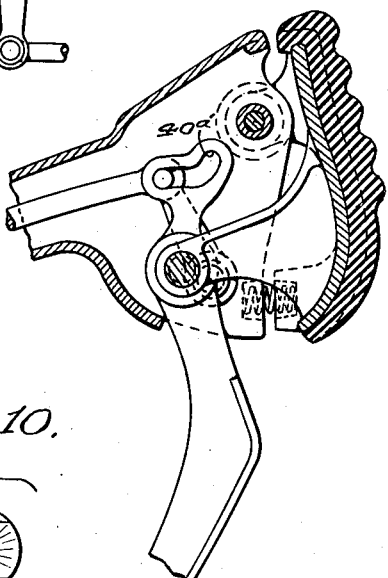
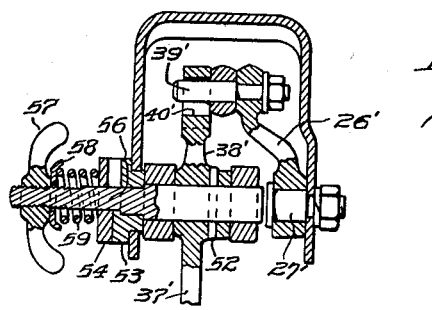
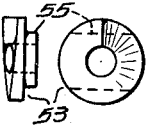
INVENTORS
James B. Franks Jr.,
Frank G. Alborn.
BY
ATTORNEY
WITNESS Patented Mar. 19, 1940

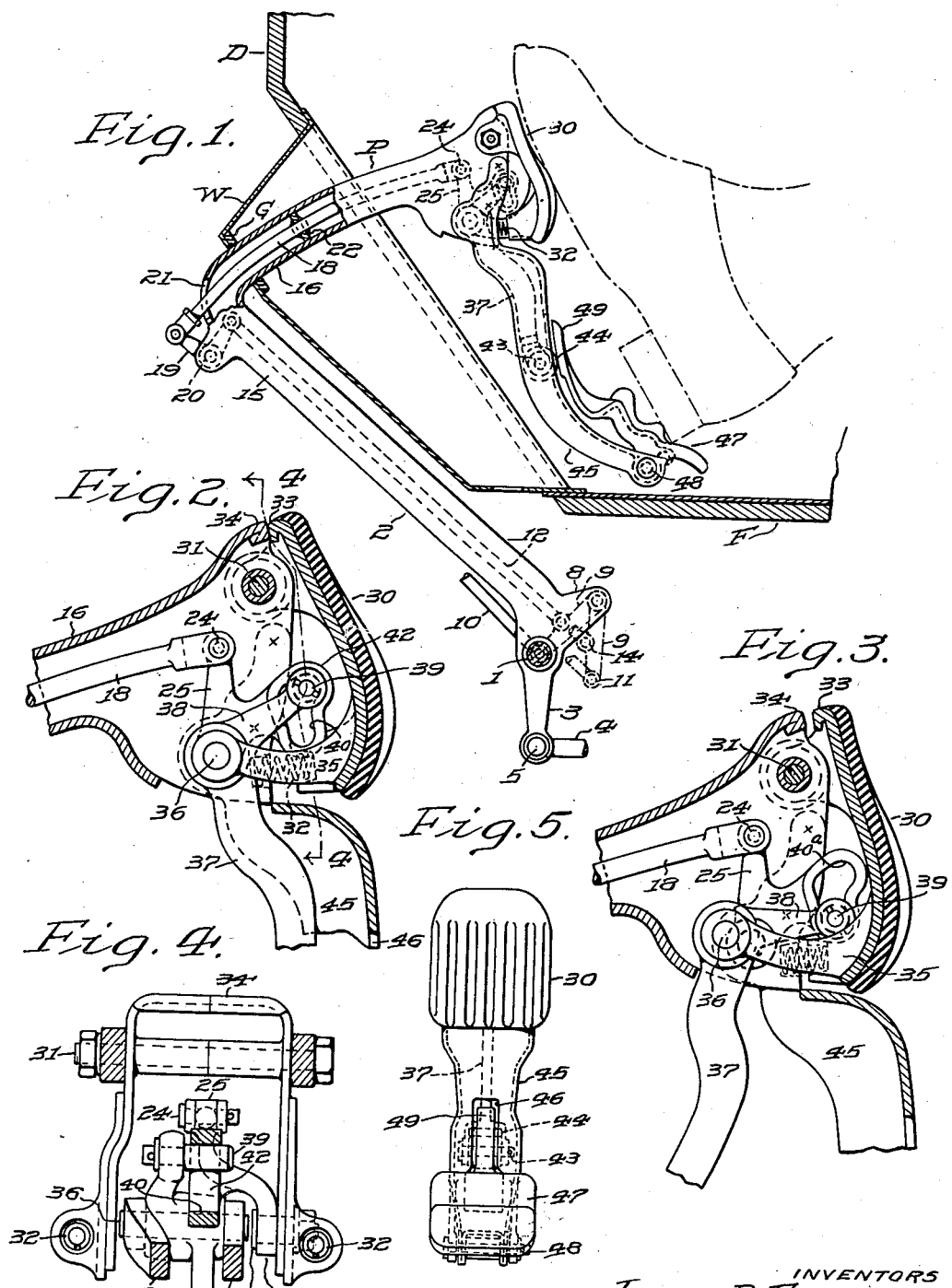

2,193,865

UNITED STATES PATENT OFFICE 2,193,865

MOTOR VEHICLE CONTROL MECHANISM

James B. Franks, Jr., Philadelphia, Pa., and Frank G. Alborn, Norwalk, Conn., assignors to Andrew R. McCown, Esquire, trustee, Philadelphia, Pa.

Application April 6, 1938, Serial No. 200,404

19 Claims. (Cl. 192—3)

The present invention relates to mechanism for actuating control elements of motor vehicles, particularly the brakes and engine throttle, to provide maximum safety in operation and maximum physical comfort to the vehicle operator.

We are aware that numerous suggestions have heretofore been made regarding the operation of these elements by a single pedal having a dual movement, as well as by juxtaposed independently movable pedal parts which operate the control elements separately, but these mechanisms have certain disadvantages which have prevented their being accepted by the motor industry.

Thus the single pedal controls having dual movement usually have a "dead center" at some point, the presence of which sometimes tends to interfere with and confuse the operator and thus induce a material delay in his operation of the brakes after closing the throttle or in opening the latter after the brakes are released with the attendant risks of otherwise avoidable accident or damage to the vehicle mechanism.

Those mechanisms with which we are familiar comprising juxtaposed independently movable pedal parts for operating the brakes and throttle separately are usually not open to this objection, but under certain conditions are even more undesirable in that in emergencies the operator may inadvertently operate the brakes and the throttle while intending to operate but one of them, and as opening the throttle during application of the brakes may cause the automobile to increase its speed when a decrease thereof is required, the operator may in consequence become confused and more or less lose his ability and sense of control.

In modern automobiles accurate control of the brake and throttle actuating elements is of greatest importance because relatively high speeds are now attained in traffic-congested districts as well as on open highways and give rise to frequent emergencies which require the throttle to be closed and the brakes applied in very rapid succession to avoid accident so that when more than a very small fraction of a second intervenes between these two operations an otherwise avoidable collision may occur.

It is therefore a principal object of the invention to provide mechanism for controlling the brakes and throttle of a motor vehicle whereby the former may be applied substantially instantaneously at any position of the throttle and the latter automatically closed substantially simultaneously with the initial actuation of the brake operating mechanism.

A further object is the provision of a control mechanism of this character which permits the throttle and brake to be operated by one foot of the operator with a minimum of movement and without requiring any extreme change in his position or in fact any material movement of his foot as a whole in transferring from throttle control to brake control, while at the same time affording a comfortable and relaxed position for the foot to enable the car to be operated for a long period of time with a minimum of fatigue.

Another object is the provision of automobile brake and throttle control mechanism embodying a novel form of operating pedal which provides for movement of the operator's heel about the ball of the foot as a pivotal center during throttle operation and for forward movement of the foot as a whole and application of pressure solely through the ball of the foot during operation of the brakes.

A still further object is the provision in mechanism of the character aforesaid of means for automatically rendering the throttle control mechanism inoperative during application of the brakes whereby inadvertent opening of the throttle during braking of the vehicle is inhibited and the attainable degree of safety in operation thereby materially enhanced.

Another object is to provide throttle control mechanism carried by and supported from a brake pedal arm or lever which in turn is pivotally supported from a rigid frame part of the car whereby lost motion required to be taken up prior to operation of the brakes when the brake pedal is supported from or bears against the floor boards or other relatively yieldable part of the car is substantially eliminated.

Other objects, purposes and advantages of the invention will hereinafter more fully appear or will be understood from the following description of certain embodiments thereof, during which reference will be had to the accompanying drawings, in which:

Fig. 1 is a side elevation of a preferred embodiment of the invention with the parts in the positions they occupy when the brakes are released and the throttle is closed;

Fig. 2 is an enlarged fragmentary central vertical section thereof with certain parts shown in elevation in positions attained during full opening of the throttle;

Fig. 3 is a view similar to Fig. 2 but showing the parts in the positions they occupy just prior to application of the brakes after release of the throttle control mechanism from operative condition by preliminary movement of part of the brake control mechanism;

Fig. 4 is a fragmentary section on the line 4—4 in Fig. 2;

Fig. 5 is a view in elevation, but on a reduced scale, of the portion of the control mechanism normally visible from the operator's seat in the vehicle;

Fig. 6 is a view corresponding to Fig. 1 showing a modified embodiment of the invention;

Figs. 7, 8 and 9 are views thereof generally corresponding to Figs. 2, 3 and 4, respectively, and Fig. 10 is a composite side and face view of a part of the mechanism shown in the preceding four figures.

In the various figures like characters are used to designate the same parts.

Referring now more particularly to Figs. 1 to 5 inclusive, the floor boards F and dashboard D are of the usual construction for these parts, except that in accordance with the present invention a supplementary well W, desirably of sheet metal, is fitted in the floor adjacent the pedal mechanism to seal the driving compartment while affording adequate operating space for the pedal.

The pedal, generally designated P, operates the brakes and also carries throttle operating mechanism and is supported from the usual brake pedal fulcrum pin 1 preferably fixed to a rigid frame part of the vehicle, although if desired it can be mounted directly on the master cylinder of the braking system or other relatively non-yielding part. The brake pedal lever 2 pivoted on this fulcrum pin is formed with a projecting arm 3 which operates a brake rod 4 in the usual way, being connected thereto by a pin 5, so that movement of arm 3 about fulcrum 1 induces substantially longitudinal movement of brake rod 4 to operate the brakes. A lug 8 is formed on the pedal lever adjacent fulcrum 1 and pivotally supports an arm or lever 9 extending toward the fulcrum for pivotal connection with a throttle rod 10 by a pin 11 which is coaxial with the brake pedal fulcrum when the throttle is in closed position; when lever 9 moves about its pivot on lug 8 to actuate the throttle, however, pin 11 moves away from this relation with the fulcrum as indicated in dot and dash lines in Fig. 1, this movement being effected by a rod 12 pivoted to lever 9 on a pin 14, positioned between the pivotal center of the lever and its connection with rod 10.

Thus, when the throttle is closed, the brake pedal lever can move about its fulcrum to actuate the brakes without changing the position of the throttle, as arm 9 then merely moves about its pivotal connection with rod 10, while the latter, when the brakes are released, may be operated by movement of lever 9 without affecting the brakes, since the actuating mechanism for this lever, while carried by the brake pedal, is normally operable independently thereof.

The independence of movement of the brake operating lever on its fulcrum to apply the brakes and of arm 9 about its pivot on lug 8 to operate the throttle is derived from mechanism which is operatively connected with the rod 12 to swing arm 9 on its pivot when the brakes are not being used, and operatively disconnected therefrom to allow arm 9 to return to and remain in normal or closed throttle position when brake pedal 2 as a whole is to be moved about fulcrum 1 for applying the brakes.

More particularly, the brake pedal, as clearly shown in Fig. 1, thus comprises a substantially straight arm 15 and an arcuate offset 16 curved substantially on an arc struck from the center of brake pedal fulcrum 1 and extending through a suitable hole in the floor board well W which is preferably sealed by a gasket G in such way as to permit the pedal to move about its fulcrum 1 without changing the radial relation between offset 16 and the gasket. Offset 16 and arm 15 may be, as shown, tubular in construction, being conveniently formed from suitable stampings welded together, so that an arcuate throttle rod 18 may extend through the interior of the offset for connection with a bell crank lever 19 supported on a pivot pin 20 carried externally on the pedal substantially at the juncture between the offset and arm, rod 18 extending through a hole 21 for pivotal connection with lever 19. The latter is also pivoted to rod 12, which extends substantially parallel to arm 15, while rod 18 is supported within the offset on a spider bearing 22 which permits limited substantially longitudinal movement of the rod, but restrains any appreciable lateral movement. The inner extremity of rod 18 is pivoted by a pin 24 to one arm 25 of a bell crank 26 supported on pivot 27 from the hollow head of the pedal and is moved about this pivot to actuate the throttle in a manner now to be described, the usual throttle spring (not shown) always tending to return the throttle to closed position when the force used for opening it is relieved or removed.

Offset 16 carries at the upper edge of its free end a brake pad 30 pivoted on a pin 31; the lower end of this pad is engaged by a pair of compression springs 32 disposed in suitable sockets adjacent the lower corners of the pad and pedal, respectively, these springs tending to maintain the stop 33 on the pad in engagement with abutment 34 on the pedal offset to limit movement of the pad about its pivot 31 in one direction and return it to its limit position after it has been moved therefrom in the opposite direction by pressure of the operator's foot. The pad, which is preferably faced with rubber or other friction material, carries a pair of arms 35 which project into the pedal head and support a shaft 36 on which is rotatably mounted an accelerator lever 37; an arm 38 integral with the lever carries a transverse pin 39 extending into a slot 40 formed in an arm 42 of bell crank 26, the slot having a dwell 40a in which the pin seats to form an operative connection between arm 38 and bell crank 26. The accelerator lever 37, which is operated to control the throttle through the throttle actuating mechanism hereinabove described, extends downwardly from shaft 36 and is provided at its lower extremity with a stub shaft 43 which rotatably supports a roller 44 through the medium of which lever 37 can be moved for controlling the throttle. An arm 45, formed of channel section throughout most of its length with its upper extremity welded or otherwise secured to the pedal, has a slot 46 in its trough adjacent roller 44 and is provided with and supports an accelerator pad 47 pivoted to arm 45 on a pin 48 at its lower end, an integral cam 49 disposed adjacent slot 46 and movable therethrough being adapted to engage the roller as the pad is moved about its pivot to thereby swing lever 37 on shaft 36.

Thus when shaft 36 is in normal position coaxial with pivot 27, pin 39 and slot 40 form an operative connection between lever 37 and rod 18, so that when lever 37 is swung on shaft 36, rod 18 is moved substantially longitudinally in the offset and correspondingly actuates the throttle, Fig. 2 showing the parts in open-throttle position after lever 37 has been moved to this position by actuation of pad 47 in response to pressure of the heel of the operator's foot, the ball of the foot resting against pad 30 during this movement to serve as a steadying rest and pivotal center for the foot.

Shaft 36 and actuating lever 37, which it supports from brake pad 30 on arms 35, are normally held by springs 32 in the position shown in Fig. 2, but when the brakes are to be applied, pressure exerted by the operator through the ball of his foot against pad 30 initially swings the pad on its pivot 31 through a short arc just prior to movement of the brake pedal as a whole about its fulcrum 1 for operating brake rod 4. This initial movement of the pad carries shaft 36 and hence throttle lever 37 through a corresponding arc, the center of which is the pivot 31, to carry pin 39 out of dwell 40a and along slot 40; lever 37 therefore swings to the position indicated in Fig. 3, and the throttle, unless already closed, immediately returns to closed position under the force of its spring, as the brakes are applied or prior to their application, this movement of lever 37 having no effect upon the throttle.

Thereafter, as long as pressure on pad 30 continues to hold it in the position shown in Fig. 3, the throttle cannot be operated, as any inward pressure the operator may exert against the accelerator pad 47 merely causes it to move in slot 46 to a stop position in which cam 49 is retained out of contact with roller 44. When the pressure on the brake pad is relieved to release the brakes, however, springs 32 return pad 30 to normal position and operative connection between accelerator pad 47 and the accelerator actuating rod 18 is thereupon restored by return of pin 39 to normal position in dwell 40a of slot 40 and re-engagement of roller 44 with cam 49.

In the embodiment of the invention shown in Figs. 6–10 inclusive brake pedal arm 15' and offset 16' as well as the mechanism for connecting throttle rod 18' with the throttle are substantially the same as in the form of the invention hereinabove described. The actuating mechanism for throttle rod 18' is somewhat different, however, as the upper end of this rod is pivoted to a lever 26' supported on a pivot 27' from the pedal housing and the pivotal connection between the rod and lever is afforded by a pin 39' which extends outwardly on the opposite side of the rod from the lever into a slot 40' in one arm 38' of accelerator lever 37'. This slot is provided with a dwell 40a' in which pin 39' is normally seated for operatively connecting accelerator lever 37' with rod 18', the pin occupying a portion of the slot remote from the dwell when this connection is interrupted by movement of pad 30' during operation of the brakes.

The accelerator lever extends downwardly from the pedal and is curved at its lower end to support a facing 47' of rubber or other friction material against which the heel of the operator rests for actuating the lever. Shaft 36' carried in arms 35' has one of its ends projecting through a slot 50 in the wall of the pedal head; it is secured in the hub of the accelerator lever 37 by a taper pin 52 or the like and supports on its projecting end a pair of cams 53, 54. Cam 53, in which shaft 36' is rotatable, has a boss 55 on its inner face engaging in slot 50 while its outer face forms a helix engaged by a complementary helix on the opposed face of the other cam 54. Cam 54 is slidably carried on the shaft but is non-rotatable with respect to it due to squaring of the shaft at 56 and corresponding squaring of the central hole in the cam through which the squared portion of the shaft extends, and the outer extremity of the shaft is threaded to support a wing nut 57, which bears against a washer 58 to provide adjustable abutment for a compression spring 59 interposed between cam 54 and washer 58.

These cams and associated parts are so arranged that when the accelerator lever moves shaft 36' to open the throttle, cam 54 rotates relatively to cam 53 and the cooperative helical faces of the cams cause cam 54 to move outwardly on the shaft against the force of spring 59, thereby inducing a sensible resistance to the movement of the throttle lever in this direction. The helical faces of the cams are arranged, however, at an angular inclination such that the axial component of the force of spring 59 is not resolved circumferentially or rotatively against the shaft to urge it, and hence the lever, in the opposite direction, that is, the angularity of the helical faces of the cams to a plane normal to their axis is less than the friction angle of the material, preferably hardened steel, of which the cams are formed, and a static, rather than resilient resistance to movement of the accelerator lever in one direction is thus prevented.

The lever is readily returned to normal position by the usual throttle spring, however, when the pressure of the operator's foot is relieved since the cams offer no material resistance to lever movement in the opposite direction, although the throttle spring receives no appreciable assistance from spring 59 and the cams during the return movement.

When the brakes are to be actuated, pressure is applied to brake pad 30' in the usual way and as it moves inwardly about its pivot 31', carrying arms 35' and hence shaft 36' with it, boss 55 on cam 53, which cooperates with slot 50 to prevent rotation of the cam during pivotal movement of shaft 36' as just described, slides in the slot and thus enables the cam to move with the shaft about pivot 31', since the side walls of the slot 50 are drawn on arcs whose centers coincide with the axis of pin 31'. As this movement takes place, arm 38' of the lever 37' moves with the latter to release pin 39' from dwell 40a', and the lever is thereby operatively disconnected from throttle rod 18' so that if moved by pressure of the operator's heel, it merely causes the pin to occupy a position in the slot remote from the dwell as indicated in Fig. 8, and the movement of the pedal as a whole about its fulcrum 1' can be effected as desired to apply the brakes without opening the throttle.

Upon the release of the pressure of the operator's foot against pad 30', springs 32' move the pad in the opposite direction and promptly bring the accelerator lever back to normal position, engaging pin 39' in dwell 40a' to operatively reconnect the accelerator lever with throttle rod 18' for operating the throttle.

It will thus be evident that in accordance with our invention the brake pedal may be mounted on a relatively rigid vehicle part and be made inherently non-yielding so that substantially the entire force applied to the pad is resolved against the brake rod for operating the brakes, and little or no force or motion is lost in taking up yield or "give" in the pedal itself or in its mounting. Furthermore, the operator's foot can be kept substantially in position for braking at all times during the normal operation of the car and no time need be lost in applying the brakes at any instant, while the accelerator actuation by means of heel movement relatively to the ball of the foot as a fulcrum affords the operator sensitive control of the throttle and enables him to assume a comfortable posture in which substantially no part of his body is subject to strain or tension, although ready at all times to act instantly to apply the brakes upon the occurrence of an emergency.

The ability of our mechanism to be operated so as to permit rapid shifting from brake to throttle control is also of distinct advantage in that it allows foot-operation to be relied upon when the vehicle is temporarily stopped on a grade or incline, as for a traffic signal, and the necessity for holding the automobile stationary by means of a hand lever until the clutch is properly engaged to drive it from the motor is eliminated. Thus the foot brakes can be released and the throttle opened in such rapid succession that the clutch can be engaged upon or during release of the brakes without danger of stalling the motor, even on relatively steep up-grades provided, of course, the accelerator be properly operated.

Moreover, the mechanism causes the accelerator lever to recede from the vicinity of the operator's heel at once upon initiation of operation of the brakes, so that no interference with the normal foot action utilized for this purpose is occasioned while, particularly in the embodiment of the invention shown in Figs. 1-5 inclusive, the accelerator pad may be used as a heel rest during braking if desired without danger of any pressure applied to it being transmitted to the throttle actuating mechanism, and the possibility of accidental throttle operation during braking is thereby averted, while upon release of the brakes the heel occupies its normal position for throttle actuation without conscious effort being required to bring it to that position.

Although we have herein shown and described mechanism in which the pedal lever is made of metal stampings welded together, as we deem such construction eminently desirable under certain conditions, it will be apparent that but minor detail changes are required to enable forgings, or parts made in any other convenient way, to be used and, of course, the precise extent of the brake pedal and/or accelerator pad travel, as well as the angularity of the pedal movement or position with respect to the operator's seat or other part of the car, may readily be adjusted to suit individual preference of the manufacturer and/or user without modification of the fundamental principles utilized in attaining the purposes and objects of the invention.

While we have herein described our invention with considerable particularity, especially as embodied in a preferred and a modified brake and accelerator pedal assembly, we do not desire to limit or confine ourselves thereby in any way, as changes in modifications in the form, structure and arrangement of the several parts as well as in their method of assembly and their respective functions and relationships to each other will readily occur to those skilled in the art and may be made if desired without departing from the spirit and scope of the invention as defined in the appended claims.

Having thus described our invention, we claim and desire to protect by Letters Patent of the United States:

1. Means for respectively controlling the brakes and throttle of a motor vehicle comprising a pivoted lever having connection with the brakes, a second lever pivotally carried by the first lever and having a pivotal connection with throttle actuating means, said pivotal connection being normally substantially coaxial with the first lever pivot when the throttle is closed, means for moving the first lever on its pivot comprising a movable brake pad carried by the first lever and means carried by said pad for moving the second lever comprising a second pad having a normally operative connection with said second lever.

2. Means for respectively controlling the brakes and throttle of a motor vehicle comprising a pivoted lever having connection with the brakes, a second lever pivotally carried by the first lever and having a pivotal connection with throttle actuating means, said pivotal connection being normally substantially coaxial with the first lever pivot when the throttle is closed, means for moving the first lever on its pivot comprising a movable brake pad carried by the first lever, means carried by said pad for moving the second lever comprising a second pad having a normally operative connection with said second lever, and means forming said normally operative connection adapted to interrupt said connection when the brake pad is moved relatively to the first lever.

3. In a combined brake and throttle operating mechanism, an operator-operated pedal lever having a fixed fulcrum, throttle actuating means movable relatively to the lever fulcrum, an arm pivotally supported from the lever adapted to operate said actuating means and means forming a pivotal connection between said arm and said means, said pivotal connection being normally substantially coaxial with the lever fulcrum.

4. Mechanism of the character described comprising a pedal, movable throttle actuating means, an arm pivoted to the pedal and to said means, means for moving the arm and said actuating means comprising a pivoted lever having a pin and slot connection therewith and means for operatively interrupting said connection when the pedal is operated to apply the brakes.

5. Mechanism of the character described comprising a pivoted brake pedal lever, an arcuate offset coaxial with the lever pivot, movable throttle actuating means supported from the offset, a brake pad carried by and movable relatively to the offset, an accelerator lever carried by the brake pad and means forming an operative connection between the accelerator lever and said throttle actuating means when the brake pad is in one position on the offset, adapted to interrupt said connection when the brake pad is moved to another position relatively thereto.

6. In mechanism for controlling a motor vehicle, a movable brake pedal, a pivoted pad carried thereby, throttle actuating means carried by the pedal, an arm for moving said means pivoted to the pedal and to said means and means for moving said arm and actuating means comprising a pivoted accelerator lever carried by the pad and a pin and slot connection between the accelerator lever and the arm adapted to operatively interconnect said lever and arm when the pad is in one position and to operatively disconnect said parts when the pad is moved to a different position relatively to the pedal.

7. In mechanism for controlling a motor vehicle, a movable brake pedal, a pivoted pad carried thereby, throttle actuating means carried by the pedal, an arm for moving said means pivoted thereto and to the pedal, an accelerator lever pivotally supported from the pad, a pin and slot connection between said arm and lever operative to move the arm in correspondence with movements of the lever when the pad is in one position and means for yieldingly urging the pad toward said position, said pin and slot connection being adapted to operatively disconnect the lever and arm when the pad is moved from said position.

8. Mechanism of the character described comprising a brake pedal having a pivoted pad adapted to be engaged by the operator's foot for movement relative to the pedal in one direction, yielding means urging the pad in the opposite direction, an accelerator lever carried by the pad, throttle actuating means carried by the pedal and a pin and slot connection between the lever and said means adapted to operatively connect the lever and said means when the pad is in one position and to operatively disconnect them as the pad is moved to another position against the force of said yielding means.

9. Mechanism of the character described comprising a brake pedal, an accelerator lever carried thereby extending outwardly from the pedal and adapted for operative connection with a throttle, a brake pad movable relatively to the pedal, means actuated by movement of the pad in one direction to operatively disconnect the lever from the throttle, and an accelerator pad pivotally supported from the pedal adjacent the brake pad having a cam adapted to engage and operate the lever when the lever is operatively connected with the throttle.

10. Mechanism of the character described comprising a brake pedal, a pivoted brake pad carried thereby adapted for movement relatively to the pedal, an accelerator lever pivotally supported from the pad comprising an arm and a pin carried thereby in substantial parallelism with the lever pivot, a second lever having a slotted arm adapted to receive said pin pivoted to the pedal in substantially coaxial relation with the accelerator lever pivot when the pad is in one position and throttle actuating means carried by the pedal and pivotally interconnected with another arm of the second lever.

11. Mechanism of the character described comprising a brake pedal, a pivoted brake pad carried thereby adapted for movement relatively to the pedal, an accelerator lever pivotally supported from the pad comprising an arm and a pin carried thereby in substantial parallelism with the lever pivot, a second lever having a slotted arm adapted to receive said pin pivoted to the pedal in substantially coaxial relation with the accelerator lever pivot when the pad is in one position and throttle actuating means carried by the pedal and pivotally interconnected with another arm of said second lever, and yielding means interposed between the pad and the pedal operative to urge the pad toward position in which the accelerator lever and said second lever are in substantially coaxial relation.

12. In a combined brake and accelerator pedal, an accelerator lever carried by the pedal and movable relatively thereto, an arm rigid with the pedal and an accelerator pad pivotally carried by the arm having a cam adapted to engage the accelerator lever to move it in response to movements of the accelerator pad.

13. Mechanism of the character described comprising a brake pedal, a pivoted brake pad carried thereby adapted for movement relatively to the pedal, an accelerator lever pivotally supported from the pad comprising an arm having a slot extending substantially normal to the lever pivot, a second lever pivoted to the pedal in substantially coaxial relation with the accelerator lever when said pad is in one position, throttle actuating means pivotally interconnected with the second lever and a pin extending from said pivotal connection into the slot in the accelerator lever arm, said pin and slot connection being adapted to operate the throttle actuating means in correspondence with movement of the accelerator lever when said levers are in substantially coaxial relation and to inhibit such operation when the accelerator lever is moved from such relation with the second lever by movement of the pad relatively to the pedal.

14. Mechanism of the character described comprising a brake pedal, a pivoted brake pad carried thereby adapted for movement relatively to the pedal, an accelerator lever pivotally supported from the pad comprising an arm having a slot extending substantially normal to the lever pivot, a second lever pivoted to the pedal in substantially coaxial relation with the accelerator lever when said pad is in one position, throttle actuating means pivotally interconnected with the second lever, a pin extending from said pivotal connection into the slot in the accelerator lever arm, said pin and slot connection being adapted to operate the throttle actuating means in correspondence with movement of the accelerator lever when said levers are in substantially coaxial relation and to inhibit such operation when the accelerator lever is moved from such relation with the second lever by movement of the pad relatively to the pedal, and yielding means operative to urge the pad to a position in which said levers are in substantially coaxial relation.

15. Mechanism of the character described comprising a brake pedal, movable throttle actuating means and operating means therefor comprising a pivoted lever, a movable lever fulcrum, means mechanically interconnecting the lever with said actuating means operable to move the latter in correspondence with movements of the lever when the lever fulcrum is in one position and to render the lever ineffective to move the actuating means when the fulcrum is in another position, and means carried by the pedal for moving the fulcrum from the first position to the second position when the pedal is operated to apply the brakes.

16. Mechanism of the character described comprising relatively movable operator-operated parts respectively adapted to actuate independent vehicle control elements, one of said parts being pivoted for movement about a fulcrum movable relatively to the other part, means operative to actuate one of the control elements from said one part when the fulcrum is in one position relatively to the other part and means carried by said other part adapted to move said fulcrum to a position such that said one part is ineffective to actuate said control element when the other part is operated to actuate the other control element.

17. Mechanism of the character described comprising relatively movable operator-operated parts respectively adapted to actuate independent vehicle control elements, means carried by one of the parts forming for the other part a fulcrum movable relatively to the first part, means operatively interconnecting said other part with one control element adapted when said fulcrum is in one position to operate said one control element in correspondence with movement of said other part about said fulcrum and when said fulcrum is in another position to inhibit such operation of said control element, and means for moving said fulcrum from the first position to the second position when the first part is operated for actuating the other control element.

18. Mechanism of the character described comprising relatively movable operator-operated parts respectively adapted to actuate independent vehicle control elements, means for supporting one of the parts from the other comprising means forming for said one part a fulcrum movable relatively to said other part, means for operatively interconnecting said one part with one of the control elements comprising a pin and a slotted lever cooperative therewith when said fulcrum is in one position adapted to operatively disconnect said one part and control element as said fulcrum is moved to another position relatively to said other part.

19. Mechanism of the character described comprising relatively movable operator-operated parts respectively adapted to actuate independent vehicle control elements, means for supporting one of the parts from the other for pivotal movement about a fulcrum movable relatively to said other part, a pin and slotted lever connection between said one part and one of the control elements adapted when the fulcrum is in one position to operatively connect said one part with said control element and as said fulcrum is moved to another position relatively to said other part, to then operatively disconnect said first part from said control element and yielding means urging the fulcrum toward the first position.

JAMES B. FRANKS, Jr.
FRANK G. ALBORN.